2,779,527
Patented Jan. 29, 1957

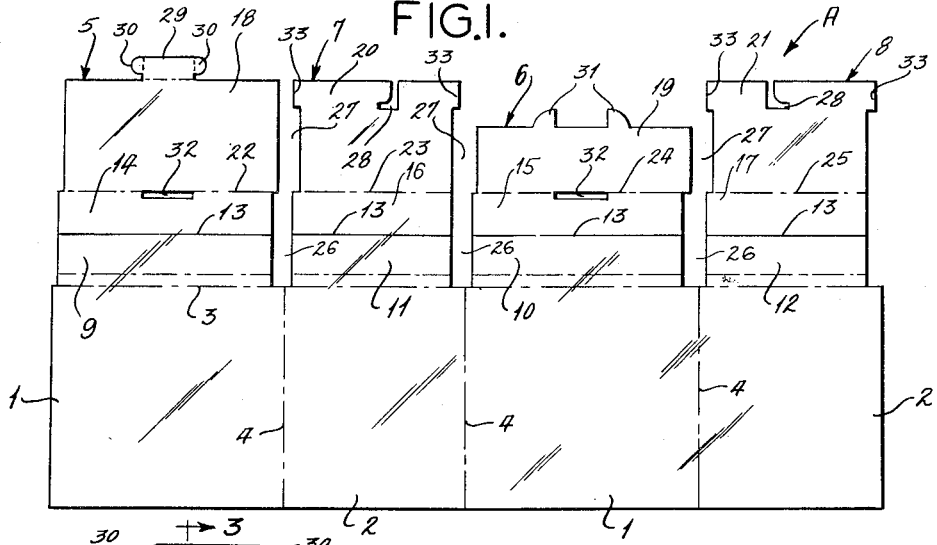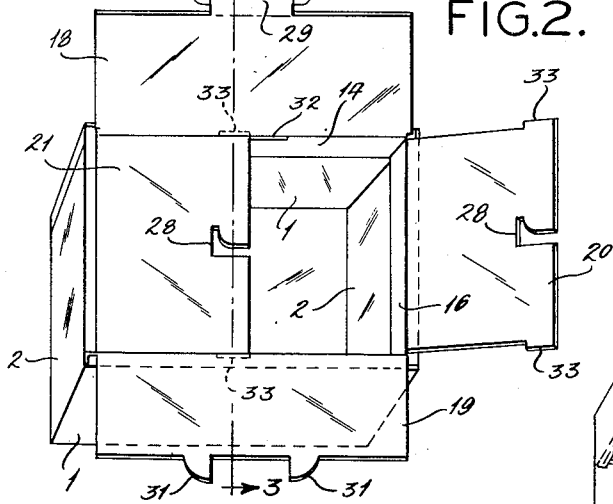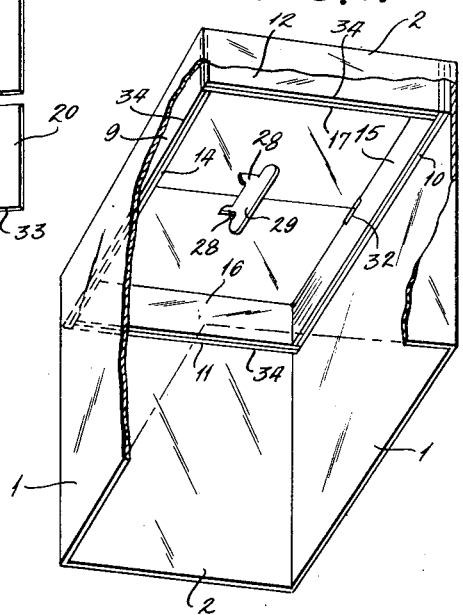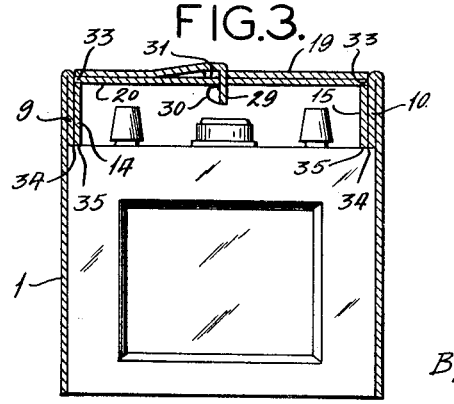

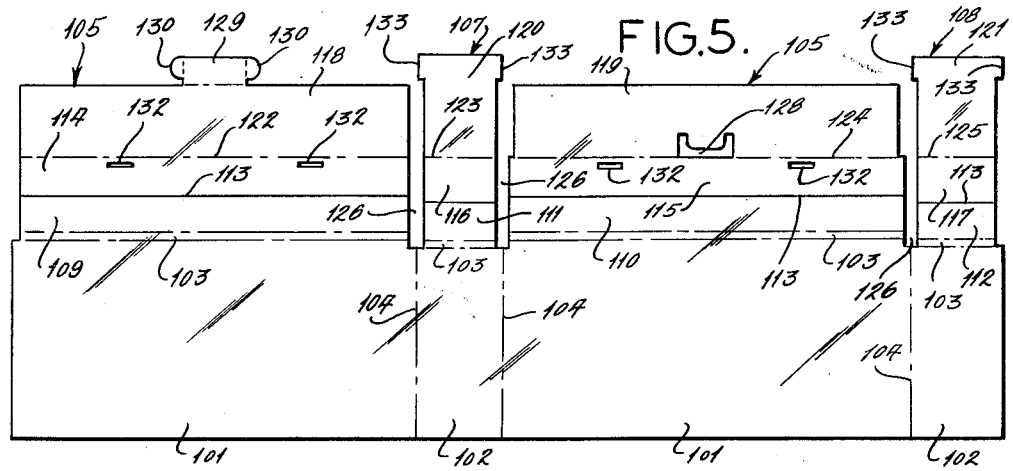
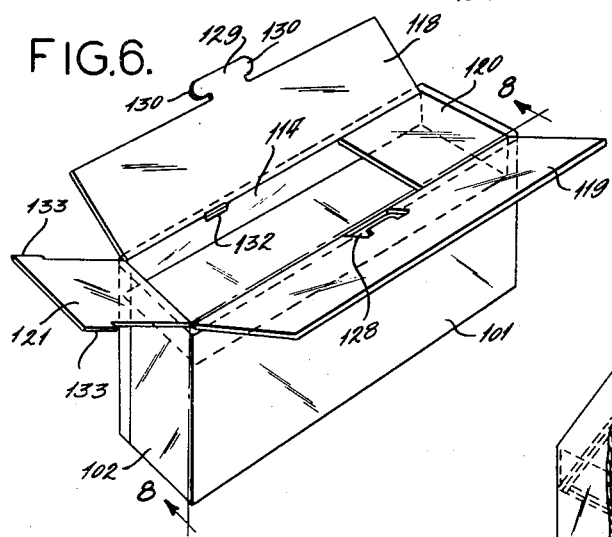
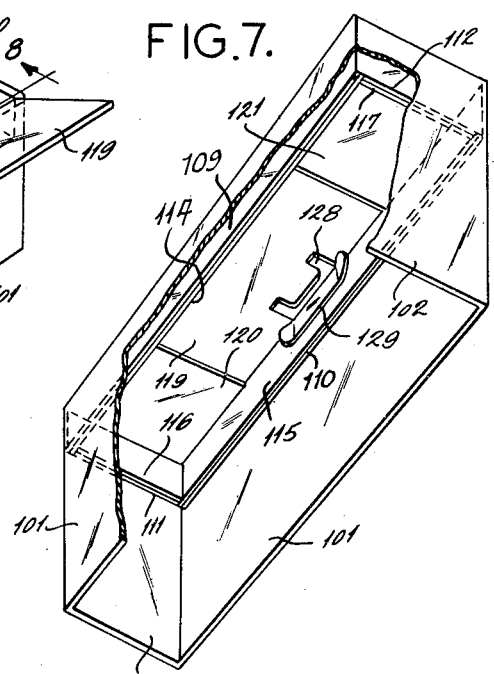
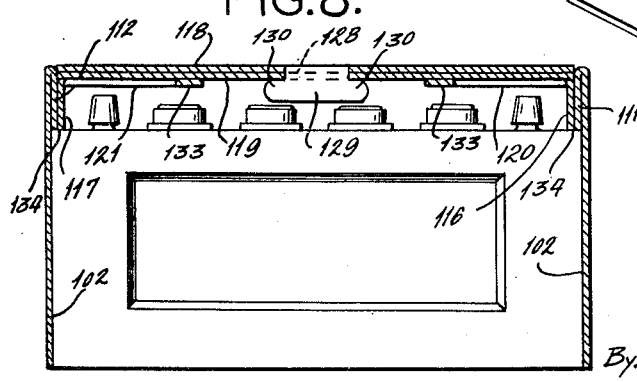

2,779,527
BATTERY SHIPPING CONTAINER

Clifford D. Fallert, St. Louis, Mo., assignor, by mesne assignments, to Crown Zellerbach Corporation, San Francisco, Calif., a corporation of Nevada Application December 6, 1952, Serial No. 324,495

1 Claim. (Cl. 229—39)

This invention relates to improvements in shipping containers, more especially to cases used for packaging electric storage batteries for shipment by railroad and trucks, storage in stacks in warehouses and maintaining them in a clean serviceable condition until they are used.

Batteries of the class described have relatively fragile, easily damaged terminal posts and cell connections extending above the top surface of the battery and battery case. Since it is the customary practice to stack a plurality of packaged batteries one upon the other during storage and shipment, the container must provide ample protection to the fragile projections against distortion or damage by directing the weight of the superimposed batteries exclusively on the rigid casing of the battery. Since the weight on the lowermost battery in the stack of superimposed batteries may amount to 650 pounds or more, the construction of the top portion of the container must obviously be quite rigid in order to prevent any portion of the top load reaching the fragile projections above the level of the battery case.

Furthermore, it is the usual practice to package batteries for shipment on high speed assembly lines, consequently, it is desirable that the container be capable of rapid assembly from the knock-down form as shipped to the user and provided with a cover which may be secured with a minimum of operations.

One of the principal objects of this invention is to provide a battery case with a cover formed of extensions of the walls of the case which may be rapidly and automatically snap locked into closed position without the use of staples, glue or other securing means with a clearance above the battery terminals.

Another important object is to provide a battery box with a continuous rib on the inner face of the upper portion of the container which seats exclusively on the upper edges of the four walls of the battery case and of sufficient strength and rigidity to transmit the vertical stress of the load above the battery directly thereon and exclude any thrust on the fragile portions of the battery.

Another object is to provide an economical one-piece container for shipping and storing electric batteries which may be knocked down flatwise for shipment and rapidly and securely assembled without the use of staples, glue, or other securing means.

Among its other objects, the invention provides a container for the purposes described that is simple and compact in design, sturdy, adapted to rapid assembly line loading, and which fully complies with the Government shipping regulations for the transportation of explosives and other dangerous articles.

Other objects and advantages of the construction herein described and illustrated by the drawings will be obvious to those skilled in the art to which this invention pertains.

The container of the invention is preferably constructed of double faced corrugated board but other suitable material may be employed if desired. This container is provided with connected side and end walls which snugly enclose the battery and extend upwardly from the bottom of the battery to a point sufficiently above the terminals thereof to insure a safe clearance between the terminals and the cover of the case.

The cover and the means for confining the weight of superimposed packaged batteries exclusively on the upper edges of the battery casing are formed of flanges integral with the upper edges of the container walls. Each flange comprises an inner fold, an intermediate reverse fold and outer cover forming portion. The inner fold extends downwardly from the upper edge of the walls to the level of the battery casing in flatwise contact with the portion of the inner face of the container wall which projects above the battery casing. The reverse fold extends upwardly flatwise against the inner fold about a cut score to substantially the height of the upper edge of the wall, thereby forming with the inner fold a continuous rigid two-ply structure above the battery case which transmits the top load on the container directly and exclusively on the top edges of the four battery casing walls.

The outer extensions of the end wall flanges are folded inwardly at right angles to the container walls and are anchored in this position by shoulders on their side edges which engage slots in the adjacent reverse folds of the side wall flanges. The extensions of the side wall flanges are likewise folded inwardly at right angles to the walls flatwise over the folded extensions of the end wall flanges and form the outer cover of the container.

The outer cover members are releasably secured in the closed position by an elongated T-shaped tab on the longitudinal free end edge of one of the members which is depressed through a U-shaped slot in the subjacent cover, the base of the slot being slightly longer than the tab to provide a clearance for the entry of the tab. Locking ears are provided on one or both ends of the tab which are bent toward each other a sufficient distance to pass through the leg portions of the U-shaped slot. When the tab is completely depressed the locking ears, due to the resiliency of the board, spring outwardly over the underface of the subjacent cover automatically locking the inner and outer members in the closed position. By lifting the container from the battery and simply realigning the locking ears of the tab with the leg portions of the U-shaped slot and forcing the tab outwardly, both the outer and inner covers may be readily released.

The length of the cover forming extensions of the wall flanges may be suitably varied to conform to the shape of the battery. For example, for nearly square or slightly elongated batteries wherein the battery cells are arranged side by side, the free ends of the flange extensions of the respective opposed end and side wall flanges are of substantially equal length and abut in the closed position. One of the side wall flange extensions carries the T-shaped tab at approximately its mid-width and the U-shaped tab receiving opening is cut in the extensions of the end wall flanges across their abutting edges, and the other side wall flange extension has tabs on its free end edge which engage the underface of the outer extension.

For the "end-to-end" cell battery which requires an elongated relatively narrow container, the cover forming extensions of the flanges integral with the side walls may overlap substantially their entire length, while the end wall flange extensions may terminate at substantially less than the mid-length of the container. In this narrow, elongated container, the U-shaped opening for receiving the locking tab is placed adjacent to the fold line of the inner side wall cover forming extensions and the locking tab at the outer edge of the outer side wall extension.

This invention also consists of the novel construction, arrangement, and combination of parts herein shown and described as will be more clearly pointed out in the following specifications.

In the drawings, wherein like characters represent like or corresponding parts,

Figure 1 is a plan view of the blank of a preferred form of the invention, showing the surface which forms the inside of the container, Figure 2 is a perspective view of the partially assembled battery box, Figure 3 is a vertical cross-section of the fully assembled box enclosing a battery, illustrating the cover clearance provided for the battery terminals. This view is taken substantially along the line 3—3 of Figure 2 after the container has been fully assembled with a battery therein, Figure 4 is a perspective view of the box of Figures 2 and 3, partially cut away, showing the construction of the underside of the cover, Figure 5 is a plan view of the blank of a box for a relatively long, narrow storage battery, Figure 6 is a perspective view of the partially assembled blank of Figure 5, Figure 7 is a perspective view of the box of Figures 5 and 6, partially cut away, showing the construction of the underside of the cover, Figure 8 is a vertical cross section of the fully assembled box of Figures 5, 6 and 7, enclosing a battery. This view is taken substantially along the line 8—8 of Figure 6 after the container has been fully assembled with an "end-to-end" battery therein.

In the drawings, Figure 1 illustrates a blank A for a slightly elongated battery case suitable for a "side-to-side" cell battery. Side walls 1 and end walls 2 are defined by a longitudinal double score 3 and vertical scores 4. The double score 3 also defines the inner boundaries of side wall flanges 5 and 6 and end wall flanges 7 and 8. The inner folds or ledge-forming panels 9 and 10 of the side wall flanges and 11 and 12 of the end wall flanges are defined by a longitudinal cut score 13. The cut score 13 is formed by cutting the face shown in Figure 1 and the corrugations of the double faced corrugated board. This score also defines the inner edges of the reverse folds 14, 15, 16 and 17. The outer edges of folds 14, 15, 16 and 17 and the fold lines of extensions thereto, 18, 19, 20 and 21 are defined by scores 22, 23, 24 and 25 respectively. Slots 26 extending from the double score line 3 to the longitudinal scores 22, 23, 24 and 25 are each offset to the left of the vertical scores 4. The purpose of these slots is to provide space for automatically nesting the ends of the inner and reverse folds of the flanges of walls 1 and 2 in the course of assembling the blank. Slots 27 extending upwardly from scores 22, 23 and 24 are centered on the vertical scores 4 and provide the necessary folding clearance for the flange extensions 18, 19, 20 and 21 when the blank is assembled. The offsetting of slots 26 to the left of the vertical scores 4 provides a rapid and convenient method of folding the flanges in counter clockwise order whereby one end of each rib section is braced against the wall by the end edge of the adjacent rib section. If it is desired to fold the flanges in clockwise order the slots 26 are offset to the right of the vertical scores 4.

The extensions 20 and 21 which form the inner cover of the container have aligned L-shaped cooperating openings 28 which form a U-shaped opening in the assembled form of the inner cover. The outer extension 18 has an elongated T-shaped tab 29 with locking ears 30 adapted to be inserted in the U-shaped opening in the inner cover in the assembled position. The extension 19 has locking ears 31 which engage the underface of the extension 18 and holds the extensions 18 and 19 in abutting relation in the closed position. The reverse folds 14 and 15 have slots 32 adapted to receive locking tabs 33 on extensions 20 and 21 in the assembled position of the container.

The container blank may be assembled in any convenient manner. A preferred method is to fold the side walls 1 and 2 about the scores 4 to form a rectangular body and connect the remote side edges of the walls together by tape or other suitable means. The inner portion of one of the wall flanges, for example, portion 12 of wall 2 is folded inwardly and downwardly, thence reversely upward about the cut score 13 to form the fold 17 and the two-ply ledge 34, best shown in Figures 3 and 4, which seats on the edge 35 of the battery casing. The inner and reverse portions of the flanges of the other walls are similarly folded in the counter clockwise order which results in the continuous downwardly projecting ledge 34 on the inner face of the four walls which ledge will be in alignment with and rest upon the four top edges of the battery casing when the container is placed over the battery.

The flange extensions 20 and 21 are folded inwardly at right angles to the end walls in which position the locking tabs 33 engage the slots 32 in the reverse folds 14 and 15, locking the extensions in horizontal position and forming the inner cover of the container. The extension 19 of the side wall is folded over the end wall extensions 20 and 21 and the side wall extension 18 in turn likewise folded flatwise over extensions 20 and 21 in substantially abutting relation to extension 18, the locking ears 31 lying against the underface of extension 18 and anchoring extension 19 in place. The locking ears are then bent inwardly so that the tab 29 and its locking ears 30 will conform to the shape of the U-shaped opening formed by the slots 28 in the inner cover and the locking device inserted therein. The locking ears 30, due to the resiliency of the board, spring outwardly over the inner faces of extensions 20 and 21 and effectively lock the inner and outer covers to each other in closed position in a substantially horizontal plane at about the upper edges of the side walls of the container. The covers are thus locked at a level which provides a safe clearance above the fragile battery terminals when the battery is enclosed therein.

In the drawings, Figures 5 to 8 inclusive illustrate a modified form of the container for an elongated narrower style of battery. In this form of the invention the side walls 101 are lengthened and the end walls 102 are narrowed to conform to the shape of an "end-to-end" style battery. The side and end walls are defined by the double score 103 and vertical scores 104. The double score 103 also defines the inner boundaries of the side wall flanges 105 and end wall flanges 107 and 108. The inner folds 109 and 110 of the side wall flanges and 111 and 112 of the end wall flanges are defined by the longitudinal cut score 113 which also defines the inner edges of the reverse folds 114 and 115, 116, 117. Longitudinal scores 122, 123, 124 and 125 define the outer edges of the reverse folds mentioned and the inner edges of extensions 118, 119, 120 and 121. It should be noted that the cut score 113 is offset downwardly in the flanges 107 and 108 with relation to the flanges 105. This is for the purpose of providing folding clearance when the container is assembled. The slots 126 in this form of the invention are centered on the vertical scores 104.

A U-shaped slot 128 is cut in the extension 119 of the side wall preferably about mid-way the length of the extension and adjacent the fold line 124. In this case the flange extensions 120 and 121 of the walls do not necessarily extend to the mid-length of the container and are anchored in slots 132 as hereinbefore described by locking shoulders 133.

The walls and two-play ledges 134 of the modified form are folded in the same manner as the corresponding portions of the preferred form. The end wall flange extensions 120 and 121 are folded inwardly at right angles to the end wall 102 in which position the locking shoulders 133 engage the slots 132 in the reverse folds 114 and 115. The side wall flange extension 119 is folded inwardly and downwardly in right angular relation to the side wall and the other side wall flange extension 118 is folded flatwise in superposed relationship to the extension 119. The locking tab 129 is then inserted into the U-shaped opening 128 whereupon the locking ears 130 spring outward on the underface of the extension 119 locking the covers securely in the closed position.

The battery case of the invention has many advantages. It is made from a one piece blank and shipped to the user and stored in knocked down form, reducing the storage space requirements and holding the inventory stock to a minimum. The box requires no staples or glue and may be simply and readily set up and automatically locked in closed position in a few seconds. It is of sturdy construction capable of supporting a top load of 8 or 10 superimposed batteries in a vertical stack and distributing the load exclusively on the top of the casing wall. A further advantage is the extreme economy of board required; the rectangular blank requires a minimum of board and is designed to substantially eliminate waste.

Although the containers hereinbefore described are shown without a bottom closure, such closures may be made in any suitable are preferred manner when so desired or needed.

It is to be understood that the embodiments herein described are illustrated and not restrictive, and it is also to be understood that the invention may be susceptible to embodiment in other modified forms and that all such modifications which are similar or equivalent hereto come equally within the purview of the claim next appearing.

What I claim is:

A one-piece open bottom corrugated paperboard container adapted to enclose an electric storage battery having fragile upstanding projections extending above the battery case, said container comprising pairs of opposed side and end wall panels adapted to frictionally enclose a battery case and to extend above the level of the battery projections, the corrugations of the paperboard extending parallel to corner defining score lines between said side and end wall panels so as to extend vertically in relation to a battery which is to be positioned in the container, each wall panel having an upper integral ledge-forming panel folded about a double transverse score inwardly flatwise against the inner face of the wall to which it is attached and thence reversely upwardly about a cut and foldably connected score flatwise against the first mentioned fold to substantially the plane of the top of the container walls, an inwardly foldable closure flap constituting an extension of each ledge-forming panel for closing the upper end of the container, means for releasably interlocking opposite side edges of one pair of opposed flaps at right angles to a pair of opposed panels, means to releasably interlock another pair of opposed superposed flaps to each other and to said one pair of opposed flaps and forming a two-ply closure, one of the extreme side edges of each of the ledge panels positioned in respective inner corners of the container, the other extreme side edges of each of the ledge panels abutting a marginal end portion of adjacent ledge panels positioned in the said respective corners of the container thus forming a rigid conterminous compact two-ply stacking ledge the height of which is slightly greater than the upstanding projections on the battery which is to be enclosed by said container, said ledge having vertically extending corrugations throughout and a relatively wide flat bottom bearing surface which is provided by the cut scores, and said bearing surface adapted to engage the upper edges of a battery case.

References Cited in the file of this patent

UNITED STATES PATENTS

| | | |
|---|---|---|
| 225,013 | Knobeloch | Mar. 2, 1880 |
| 1,132,293 | Weiss | Mar. 16, 1915 |
| 1,550,646 | Larson | Aug. 18, 1925 |
| 1,696,341 | Blanchard | Dec. 25, 1928 |
| 1,965,215 | Boeye | July 3, 1934 |
| 2,116,652 | Adler | May 10, 1938 |
| 2,216,299 | Schilling | Oct. 1, 1940 |
| 2,382,891 | McCormick | Aug. 14, 1945 |
| 2,578,107 | Thacker et al. | Dec. 11, 1951 |
| 2,671,599 | Price | Mar. 9, 1954 |

FOREIGN PATENTS

| | | |
|---|---|---|
| 784,254 | France | July 22, 1935 |